March 4, 1969 L. R. GIGNILLIAT III 3,430,491
DISPOSABLE CLINICAL THERMOMETER
Filed Dec. 27, 1966 Sheet 2 of 2

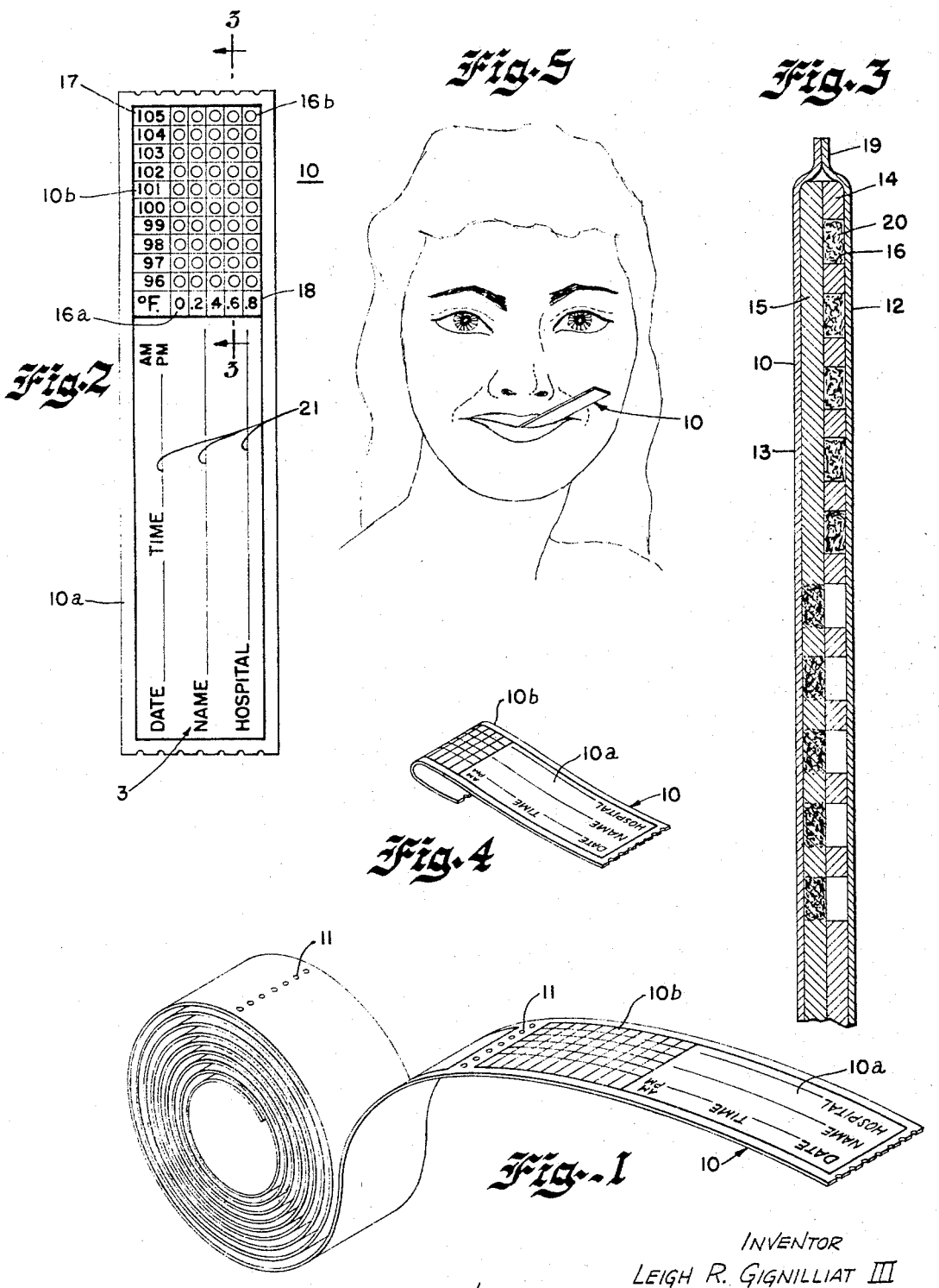

INVENTOR
LEIGH R. GIGNILLIAT III
by Mason, Kolehmainen, Rathburn and Wyss
ATTORNEYS

United States Patent Office 3,430,491
Patented Mar. 4, 1969

3,430,491
DISPOSABLE CLINICAL THERMOMETER
Leigh R. Gignilliat III, 359 Sheridan Road,
Winnetka, Ill. 60093
Filed Dec. 27, 1966, Ser. No. 604,689
U.S. Cl. 73—358                                                13 Claims
Int. Cl. G01k *11/00*

ABSTRACT OF THE DISCLOSURE

There is provided a clinical thermometer formed with an absorbent backing layer and a nonabsorbent upper layer having a plurality of perforations. Each of the perforations defines pockets containing a substance capable of melting at a predetermined temperature. The entire set of layers is enclosed within a transparent covering. In use the maximum temperature to which the thermometer has been exposed can be determined by the melting of the substances within the respective pockets and absorption into the backing layer.

This invention relates to a clinical thermometer intended to be discarded, or possibly stored as part of a patient's health record, after only a single use.

As is well known, the standard thermometer for clinical use has long been the mercury thermometer, not because it lacks dangers and disadvantages for such use, but because no really effective substitute has heretofore been developed. In general, mercury thermometers are unsafe because they are easily breakable, because they contain mercury, a poison, and because of the inherent problems in adequately sterilizing them to prevent cross-contamination. In addition to such dangers, conventional clinical thermometers are slow to register temperatures and are difficult to read and, to the extent that considerable nursing time is required for taking and reading such temperatures, and in the storage, handling and sterilization thereof, the use of glass thermometers is a substantial expense for hospitals, clinics, and the like.

Efforts have been made to find an effective substitute for the glass clinical thermometer but such efforts have not been entirely successful. One known thermometer is provided with a plurality of chambers containing chemicals which change their appearance in response to temperature conditions to which they are subjected. Moreover no effective method has heretofore been devised to localize the multiple temperature-sensing points of such a thermometer so that all of such points are exposed to the same body temperature of the patient.

Therefore, one of the principal objects of the present invention is to provide a clinical temperature-sensing device which, utilizing the known melting points of certain chemicals, is specifically designed for use as a disposable clinical thermometer, and which overcomes the shortcomings of prior clinical thermometers of the chemical response type as well as the glass-mercury type. Specifically, it is an object to provide a thermometer which is safe and reliable in use. With respect to reliability, it is an object to provide a clinical thermometer in which the temperature-sensing portion thereof is compact, assuming a position in a patient's mouth or other temperature reference position so that all of the multiple temperature-sensing points may be exposed to the same temperature, whether the patient be an adult or an infant. Yet each temperature-sensing point must be isolated from the others.

A further object is to provide a clinical thermometer made of unbreakable and pliable materials so that the device will not injure a patient when applied orally, and so that a patient cannot bite ito or break the device with his teeth, thus eliminating the need in many instances for rectal application. Another object is to provide a device constructed in such a way that it is not readily reusable, that is, is disposable after one use, to avoid the problems of contamination on reuse. Additional objects lie in providing a device which will read out within a relatively short period of time to minimize the discomfiture, if any, experienced by the patient when his temperature is taken, and to minimize the clinician's time involved in taking temperatures; which is of sufficient dimension so that the user will not come into contact with the saliva of a patient during normal use of the device; which gives a graphic, fixed reading so that a user can quickly and easily ascertain a patient's temperature; and which provides space for the purpose of identifying the patient and the date and place of the recording.

An additional object is to provide a clinical thermometer which is highly adaptable for use through its flexibility and design for taking the temperature at any desired point of the body, the flexibility and design giving intimate contact with the body.

Other objects will appear from the specification and drawings in which:

FIG. 1 is a perspective view of a roll of disposable clinical thermometers embodying the present invention;

FIG. 2 is a top plan view of such a thermometer;

FIG. 3 is an enlarged transverse sectional view taken along line 3—3 of FIG. 2;

FIG. 4 is a perspective view illustrating the condition which such a thermometer might assume during use thereof;

FIG. 5 is an illustration showing how the thermometer is actually inserted into patient's mouth;

Figure 6:
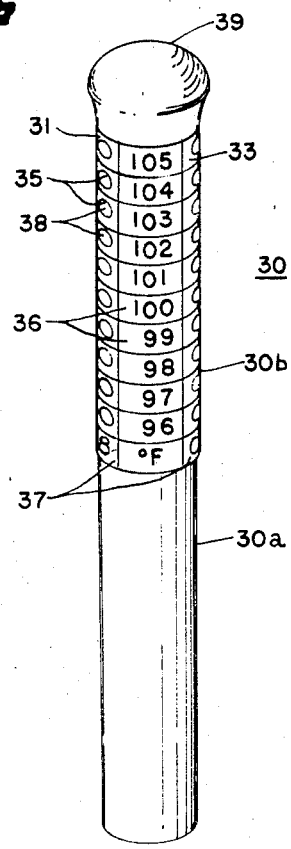
FIG. 6 is a perspective view illustrating another embodiment of the invention.

Referring to the drawings, the numeral 10 generally designates an elongated strip thermometer which is of generally rectangular shape and which is longitudinally divided by a transverse definition line to provide an extended or identification end portion 10a and a temperature-sensing or grid portion 10b. Since the strip is of uniform width throughout its longitudinal extent, it may be formed and supplied to the user in the tape form illustrated in FIG. 1, or any other suitable method to provide sanitary dispersion. As illustrated the strip thermometers are arranged in longitudinal series and being separable at the time of use along transverse perforation lines 11. While the roll form is particularly desirable from the standpoint of user convenience, it is to be understood that the strip thermometers may also be supplied as discrete units, or as separable portions of larger sheets.

Each thermometer strip comprises a top covering layer or sealing tape 12, a bottom covering layer or sealing tape 13, a non-absorbent inner layer or mask 14, and an absorbent backing layer or blotter 15. While each of the layers may be formed from any of a variety of suitable materials, it is important that each layer, and the thermometer strip as a whole, be flexible or bendable. Cover layers 12 and 13 must be moisture impermeable so that together they form a protective envelope for the thermometer. Top cover layer 12, or at least the temperature-sensing portion 10b of that layer, serves to close the thermometer and seal out contaminants while permitting a clear readout of the indicated temperature. While any of a variety of transparent plastic films or sheet materials may be used for the outer covering layers, films of ethyl cellulose, polyester, polyvinyl alcohol, polyvinylidene chloride, and polyvinyl chloride have been found particularly effective. An example of one particular tape is Temp-R-Tape "Kapton" made from polyimide film with pressure-sensitive silicone adhesive. This tape is a good heat conductor, transparent, thin, soft, moisture resistant with adhesive that does not react with chemicals used for readout.

The bottom layer 13 serves to seal out contaminants while allowing rapid penetration of heat. A variety of plastic films or sheet materials may be used. One tape found well suited for this application is metalized polyester film. This tape is bright and shiny gold color, completely opaque, is a good thermal conductor, moisture resistant, flexible, with a pressure-sensitive adhesive not reacting with the chemicals used.

The non-absorbent inner layer or mask 14 may be formed of a suitable opaque plastic or metal material or it may be formed of paper which has been coated to make it non-absorbent. As shown most clearly in FIGS. 2 and 3, the mask 14 is perforated in the temperature-sensing area 10b of the strip thermometer to provide a plurality of chambers 16. The cavities 16 are arranged in a grid pattern; in the illustration given, the pattern comprises five longitudinally extending rows of openings and ten transversely extending rows. A satisfactory condition has been found when the chambers 16 are approximately .075 inch diameter on a .100 inch grid. Indicia 17 imprinted on a longitudinal edge portion of the perforated layer reveal that each transversely extending row represents one degree of temperature measured on the Fahrenheit scale (or a suitable increment measured on other acceptable scales), all of the openings covering the temperature of 96° F. through 105° F. As indicated by numerals 18 also imprinted upon the perforated layer, the five longitudinally extending rows represent temperature increments of one fifth of a degree. Thus, chamber 16a in the lower left corner of the grid as shown in FIG. 2 is located at a point indicated as 96.0° F., whereas chamber 16b in the upper right corner is located at a point indicated as 105.8° F. While a greater or lesser number of openings may be provided, it is believed that the number and range shown is particularly suitable for use in a clinical thermometer and that temperature readings within 0.2 of a degree within the general range of 96° to 106° F. are at least equal in accuracy and precision to those obtainable with conventional mercury thermometers and accepted as the U.S. standard. It will be understood that other temperature scales may be used. For example, temperature readings within 0.1 of a degree centigrade within the general range of 36° to 41° C. are also commonly acceptable.

The material selected for the mask 14 must be strong enough to afford a high density perforation without tearing; must accept printers ink, or some other graphic display media, so as to allow for printing of the indicia 17; must be thick enough to form walls of the chemical holding chambers 16 when assembled into the final thermometer; should be pliable enough to conform to irregular shapes (patient's mouth) without causing discomfort; must be chemically resistant; and must be opaque in order not to allow any materials underneath to show through. The physical size is determined by the size and density of holes. For reasons of comfort to the patient the size should be as small as possible but not at a sacrifice of clearness of readout. A convenient width is .750". The length is immaterial as it may include the identification and protrude out of the patient's mouth. Materials which may be used for the mask 14 include metal foil, chemically resistant paper, plastic tape, and the like, which are effective to isolate the chambers 16.

The purpose of the absorbent layer or blotter 15 is to absorb all of the melted chemical and allow its own color (blotter's color) to be visible inside of the perforation in the mask. Because of the fluid absorption characteristic this material must be porous. The thinner the blotter the less mass is there to heat up. There must be enough thickness, however, to blot out all of the melted chemical. If the blotter is too thin, or the chambers 16 spaced too closely, the blotted liquid will spill over and wet the chemical in the adjoining compartment, affecting the appearance of the chemical and confusing the readout.

The minimum thickness then, is determined by the amount of liquid to be blotted and spacing between cavities. The maximum thickness really is not limited except that the thicker the blotter the poorer heat conductor it becomes. The ideal condiion is where the thickness is kept at minimum and blotted liquid wets the area immediately below its cavity and half way to the adjoining one. a reasonable compromise was found with four ply loose woven paper. The thickness was approximately .005 inch and absorption capability sufficient to blot out all of the chemical placed in the cavity.

One other requirement of the blotter is to have a color which is strikingly different from that of the mask. When the chemical is in place the color of the hole is that of the chemical. Once the chemical melts and is blotted out the color of the botter becomes visible thus accomplishing a change of color and providing the readout.

The absorbent layer 15 is secured by adhesive or by other suitable means to the underside of the mask 14. The two layers are coextensive and, as previously indicated, are encased within an envelope formed by covering layers 12 and 13. The covering layers are secured by adhesive or other appropriate means to the outer surfaces of layers 14 and 15, and may have peripheral portions 19 which project outwardly beyond the edges of the inner layers. As shown in FIG. 3, the peripheral portions 19 of the upper and lower covering layers are joined so that a substantially hermetic and moisture-proof seal is formed about the laminated inner layers 14 and 15.

The covering layers 12, 13 may also be provided in other suitable means, for example, a pre-cooled thermometer may be dipped in a fluid bed of suitable coating which can then be cured to form the protective layers 12, 13.

Each of the chambers 16 is therefore completely closed by layers 12, 14 and 15. Specifically, the mask 14 defines the lateral boundary for each pocket, the imperforate cover layer 12 defines the upper boundary, and the absorbent backing layer 15 constitutes the lower boundary. Within the confines of each chamber is an innocuous chemical substance 20 which has a melting point at the temperature indicated by numeral indicia 17 and 18. Thus, the chemical compound in the chamber designated in FIG. 2 as 16a has a melting point of 96.0° F., whereas the substance in the chamber designated 16b has a melting point of 105.8° F. An organic compound such as methyl stearate, which has a melting point of approximately 102° F., may be used most effectively in one of the chambers 16. Other organic compounds having melting points in the range from 92° to 108° F. can be used, including the following:

4-diethylaminobenzaldehyde
2,3-dimethyl-2,3-butandiol
4-phenyl-3-buten-2-one
1,1-difluoro-1,2,2,2-tetrachloroethane
Stearonitrile
8-pentadecanone
1-indanone
1,3-diacetin
2-aminobenzaldehyde
1,6-diaminohexane
Trielaidin
Dimethyl itaconate
Benzyl cinnamate
Levulinic acid
Delta-valerolactam
Methyl cinnamate Heneicosane
1,6-hexanediol
Methyl nicotinate
Ethyl stearate
Ethyl nonadecanoate It is possible by controlling the purity or with suitable compounds of these substances to obtain substances melting slightly lower than the pure compounds. In this way one can obtain a large number of materials melting from 92° to 108° F., and one can select suitable materials melting at 0.2° increments throughout the range.

In practice, it has been found desirable to use substances which, in their solid state, are white or light color in appearance, and to print or coat the outer surface of layer 14 so that it is of generally the same color. Also important is the fact that the absorbent layer 15 must be of a strong and contrasting color so that when the compounds in the chambers 16 liquefy and are absorbed by the absorbent backing layer 15, as indicated in the right portion of FIG. 3, the strong color of the backing layer will be visible through the transparent cover 12 and will provide a positive visual indication that the thermometer has been exposed to a temperature in excess of the designated temperature. If the thermometer registered a normal body temperature of 98.6° F., then the red, black, or other contrasting color of backing sheet 15 would be visible through all of the openings of the grid which indicate a temperature of 98.6° or less. The readout is accomplished not by any change in the color of the chemical, but simply by its retreat from the perforations into the backing layer, thereby leaving the perforations open to reveal the sharply contrasting color of the backing sheet.

Referring to FIG. 2, it will be noted that the identification portion 10a constitutes the major proportion of the length of the thermometer. The visually exposed upper surface of the non-absorbent layer 14 is preferably imprinted with indicia lines 21 which may be seen through the transparent upper layer 12 and which suggest the entry of information concerning the identity of the patient and hospital, and the date and hour of the temperature reading. Such information may be written on the mat outer surface of layer 12 if it covers the imprinted non-absorbent inner layer 14. If the layer 12 covers only the grid portion 10b of the thermometer 10, then the information can be written directly on the unsealed identification portion 10a.

While the dimensions of the thermometer strip may be varied somewhat, it has been found that a strip approximately two and one half to three inches long and three fourths of an inch to one inch wide is particularly effective for clinical use. Approximately two thirds of the strip serves as the handle and as the identification portion 10a, the remaining one third at one end of the strip being imprinted with the grid and forming the temperature-sensing portion 10b.

In use, a strip thermometer is simply torn from the roll along perforation line 11 and the temperature-sensing portion is placed in a patient's mouth beneath the tongue. Since the strip is highly flexible, the temperature-sensing portion may be easily curled for positioning beneath the tongue as indicated in FIG. 4. In this connection, it should be noted that the perforations of the non-absorbent layer 14 further increase the flexibility or bendability of the strip because of the weakening effect produced by the absence of material of that layer. The grid end of the strip is therefore easily and normally curled beneath a patient's tongue to expose all of the chemicals within the sensing portion of the thermometer to the same body temperature. No harm would be caused to the patient if the thermometer were placed even further into the mouth. Since the grid portion is covered by the tough sealing layers 12 and 13, and since the strip is highly flexible and therefore non-breakable, the patient is fully protected even if he should inadvertently bite the thermometer with a force that would be sufficient to crack an ordinary glass thermometer.

FIG. 6 illustrates an additional embodiment of a thermometer 30 according to the present invention shaped in the form of a cylinder and which is particularly suited for rectal use. More specifically the thermometer 30 includes an extended end portion 30a and a temperature-sensing or grid portion 30b. Moreover each thermometer 30 comprising a transparent top covering layer or sealing strip 31, similar to the sealing strip 12 heretofore described; a non-absorbent inner layer or mask 33 similar to mask 14 heretofore described; and an absorbent backing layer or blotter (not shown in FIG. 6) similar to the blotter 15 heretofore described. The layers are formed into a cylinder which may be readily placed under the tongue of the patient or used rectally. The mask 33 is perforated in the temperature-sensing area 30b of the thermometer to define chambers 35. Suitable indicia 36 imprinted longitudinally on the grid portion 30b indicate that each circumferentially extending row represents one degree of temperature measured on the desired scale, all of the openings covering the corresponding temperature of about 96° through 105° F. or other temperature reference scale. As indicated by numerals 37 also imprinted upon the perforated layer 33 circumferentially along the lower end of the temperature-sensing portion, the five longitudinally extending rows represent temperature increments of one fifth of a degree F. Each of the chambers 35 contains a suitable temperature indicating chemical compound 38, which may be similar to the chemical substances 20 heretofore described. A spherical element 39 on the upper end of the thermometer 30 serves as a guide and protects against injury by sharp edges of the grid portion 30b, particularly in rectal applications. It will be understood that the thermometer 30 operates on the same principle as the strip thermometer 10.

Figure 7:
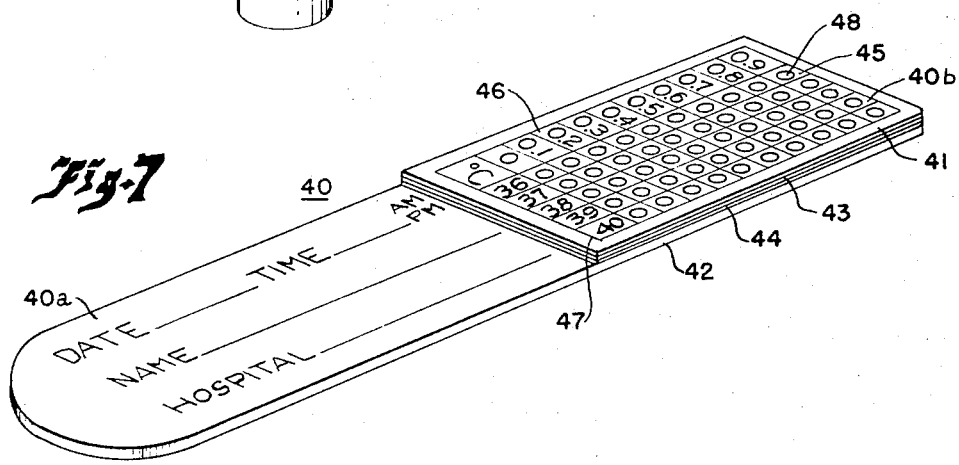
FIG. 7 is a perspective view of yet another embodiment of the invention.

FIG. 7 illustrates yet another embodiment of a thermometer 40 according to the present invention and shaped in the form of a tongue depressor. More specifically the thermometer 40 includes an extended end portion 40a and a temperature-sensing or grid portion 40b. Moreover each thermometer 40 comprises a transparent top covering layer or sealing strip 41, similar to the sealing strip 12 heretofore described; a bottom rigid portion 42 of thin wood or other suitable supporting material; a non-absorbent inner layer or mask 43 similar to mask 14 heretofore described; and an absorbent backing layer or blotter 44 similar to the blotter 15 heretofore described. The mask 43 is perforated in the temperature-sensing area 40b of the thermometer to define a plurality of chambers 45. Suitable indicia 46 imprinted longitudinally on the grid portion 40b indicate that each transversely extending row represents one tenth degree, here measured on the centigrade scale. As indicated by numerals 47 also imprinted upon the perforated layer 43 transversely along the lower end of the temperature-sensing portion, the five longitudinally extending rows represent temperature increments of one degree on the centigrade scale. Each of the chambers 45 contains a suitable temperature indicating chemical compound 48 which may be similar to the chemical substances 20 heretofore described. The thermometer 40 is generally rigid and takes on the appearance of a conventional tongue depressor. It is understood that the thermometer 40 operates on the same principle as the strip thermometer 10. This embodiment also has the advantage of minimizing the temperature gradient in the locale where the temperature is to be taken due to the rigid wooden backing.

Figure 8:
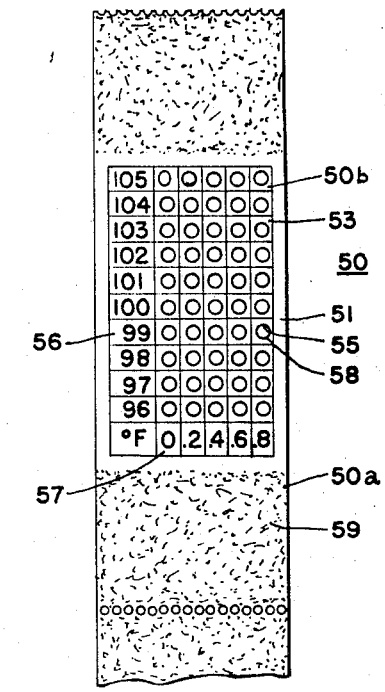
FIG. 8 is a top view of yet another embodiment of a thermometer according to the present invention.

FIG. 8 illustrates yet another embodiment of a thermometer 50 according to the present invention and is provided with pressure sensitive adhesive adapting the thermometer to be fastened to the skin to register skin temperature. More specifically the thermometer 50 includes an adhesive end portion 50a and a temperature sensing or grid portion 50b. Moreover each thermometer 50 comprises a transparent top covering layer or sealing strip 51 over the grid portion 50b similar to the sealing strip 12 heretofore described; a backing layer of plastic or other suitable material; a non-absorbent inner layer or mask 53 similar to mask 14 heretofore described; and an absrobent backing layer or blotter (not shown in FIG. 8) similar to the blotter 15 heretofore described. The mask 53 is perforated to define a plurality of chambers 55. Suitable indicia 56 imprinted longitudinally on the grid portion 50b indicate that each transversely extending row represents one degree measured on the Fahrenheit scale. As indicated by numerals 57 also imprinted upon the perforated layer 53 transversely of the temperature-sensing portion, the five longitudinally extending rows represents temperature increments of one fifth of a degree on the Fahrenheit scale. Each of the chambers 55 contains a suitable temperature indicating chemical compound 58 which may be similar to the chemical substances 20 heretofore described. The thermometer 50 is provided with suitable adhesive material 59 so that it may be adhesively secured to the skin. It will be understood that the thermometer 50 operates on the same principle as the strip thermometer 10. If desired the temperature indicating portion of the thermometer 50 may be assembled with the adhesive backing so that the indicia faces away from the skin when the thermometer 50 is in place, thus permitting reading of the thermometer without removal thereof. The temperature range for FIG. 8 could be adjusted for skin temperatures with a possible range for body temperature of 92° to 102° or 94° to 104° on the Fahrenheit scale.

While in the foregoing there has been disclosed various embodiments of the present invention for purposes of illustration, it will be apparent that numerous other modifications and embodiments may be devised by those skilled in the art which will fall within the true spirit and scope of the invention.

What is claimed as new and desired to be secured by Letters Patent of the United States is:

1. A clinical thermometer having an elongated portion at one end and a temperature-sensing portion at its opposite end; said temperature-sensing portion comprising an absorbent backing layer, a non-absorbent upper layer, and an outer layer completely covering and sealing said backing and upper layers; said outer layer covering said non-absorbent upper layer being transparent; said non-absorbent upper layer being provided with an arrangement of spaced perforations and associated indicia representing temperatures at selected partial degree increments on a desired scale corresponding to approximately 96° to 106° on the Fahrenheit scale; and each of said perforations containing an organic non-toxic, substance capable of melting at the temperature represented by the associated indicia and capable of being absorbed upon melting by said absorbent backing layer; said absorbent backing layer being of a contrastingly different color than the substance in each of said perforations and being visible through each of said perforations when the substance therein has melted and been absorbed.

2. A disposable clinical thermometer comprising a flat elongated strip having an elongated portion at one end and a temperature-sensing portion at its opposite end; said strip comprising a flexible absorbent backing layer, a flexible non-absorbent upper layer, and flexible plastic outer layers completely covering and sealing said backing and upper layers; the plastic outer layer covering said non-absorbent upper layer being transparent; said non-absorbent upper layer being provided in said temperature-sensing portion with an arrangement of spaced perforations and associated indicia representing temperatures at selected partial degree increments in a desired scale corresponding to approximately 96° to 106° on the Fahrenheit scale; each of said performations containing an organic, non-toxic, substance capable of melting at the temperature represented by the associated indicia and capable of being absorbed upon melting by said absorbent backing layer; said absorbent backing layer being of a contrastingly different color than the substance in each of said perforations and being visible through each of said perforations when the substance therein has melted and been absorbed; said temperature-sensing portion by reason of said perforations having greater flexibility than said elongated portion.

3. The structure of claim 2 in which said perforations of said non-absorbent layer are arranged in a grid pattern with one group of coordinates representing whole degrees and another group of coordinates representing fractions of a degree.

4. The structure of claim 2 in which said strip is generally rectangular in shape.

5. The structure of claim 2 in which said flexible plastic layers extend outwardly beyond the peripheral edges of said backing and upper layers; said outwardly extending portions of said plastic layers being sealed together and being integral with the outwardly extending portions of an identical adjacent thermometer; and means provided by said outwardly extending portions to facilitate the separation of the adjacent thermometers.

6. The structure of claim 5 in which said means comprises a line of perforation.

7. A disposable clinical thermometer comprising a flat strip having an extended portion at one end and a temperature-sensing portion at its other end; said strip comprising a liquid-absorbent backing layer, a non-absorbent upper layer secured to said backing layer, a transparent top layer extending over said non-absorbent layer and secured thereto, and a bottom layer; said bottom and top layers extending beyond the peripheral limits of said backing and non-absorbent layers and being sealed to each other along the edges of said strip; said non-absorbent layer of said temperature-sensing portion being provided with an arrangement of spaced perforations and associated indicia representing temperatures at selected partial degree increments in a desired scale corresponding to approximately 96° to 106° on the Fahrenheit scale; each of said perforations defining a sealed chamber and containing a dry organic, non-toxic, chemical having a melting temperature represented by the associated indicia and capable of being absorbed upon melting by said absorbent layer; said absorbent layer being of a contrastingly different color than the dry chemical substance in each of said chambers and being visible within the chamber through said transparent cover layer when the chemical substance within each chamber has melted and has been absorbed; said absorbent, non-absorbent, and covering layers all being highly flexible; whereby the temperature-sensing portion of said strip may be flexed within a patient's mouth to insure exposure of all of the chemical substances within said chambers to substantially the same body temperature.

8. The structure of claim 7 in which said strip is generally rectangular in space.

9. The structure of claim 7 in which said perforations of said non-absorbent layer are arranged in a rectangular grid pattern with one group of coordinates representing whole degrees and a second group of intersecting coordinates representing fractions of a degree.

10. The structure of claim 7 in which said temperature-sensing portion of said strips comprises a minor proportion of the length of said strip.

11. A clinical thermometer having an end portion and a temperature-sensing portion; said temperature-sensing portion comprising an absorbent backing layer, a non-absorbent upper layer, and an outer layer covering and sealing said absorbent backing and upper layers, said outer layer being transparent; said non-absorbent upper layer being provided with an arrangement of spaced perforations and associated indicia representing temperatures at selected partial degree increments on a desired scale corresponding to approximately 96° to 106° in the Fahrenheit scale; and each of said perforations containing an organic, non-toxic, substance capable of melting at the temperature represented by the associated indicia and capable of being absorbed upon melting by said absorbent backing layer; said absorbent backing layer being of a contrastingly different color than the substance in each of said perforations and being visible through each of said perforations when the substance therein has melted and been absorbed.

12. A clinical thermometer as set forth in claim 11 wherein said end portion and temperature-sensing portion are rigid.

13. A clinical thermometer having an elongated portion at one end and a temperature-sensing portion at its opposite end; said temperature-sensing portion comprising a non-absorbent upper layer, an absorbent backing layer of contrasting color to said upper layer, and an outer layer completely covering and sealing said backing and upper layers; said outer layer covering said non-absorbent upper layer being transparent; said non-absorbent upper layer being provided with an arrangement of spaced perforations and associated indicia representing temperatures at selected partial degree increments on a desired scale corresponding to approximately 96° to 106° on the Fahrenheit scale; a thin coating on the backing layer in each perforation obscuring the contrasting color from the backing layer and formed of an organic, non-toxic, substance capable of melting at the temperature represented by the associated indicia and capable of being absorbed upon melting by said absorbent backing layer whereby absorption of substance in a perforation exposes the backing layer through said perforation with a contrasting color to said upper layer.

References Cited
UNITED STATES PATENTS

| | | | |
|---|---|---|---|
| 1,535,536 | 4/1925 | Mac Donald | 73—358 X |
| 2,308,087 | 1/1943 | Lappala | 73—356 |
| 2,614,430 | 10/1952 | Ballard et al. | 73—358 |
| 2,932,971 | 4/1960 | Moore et al. | 73—356 |
| 3,175,401 | 3/1965 | Geldmacher | 73—358 |

LOUIS R. PRINCE, *Primary Examiner.*

J. W. ROSKOS, *Assistant Examiner.*

U.S. Cl. X.R.

73—356; 116—114.5

PO-1050
(5/69)

UNITED STATES PATENT OFFICE
CERTIFICATE OF CORRECTION

Patent No. 3,430,491　　　　　　　　Dated March 4, 1969

Inventor(s) Leigh R. Gignilliat III

It is certified that error appears in the above-identified patent and that said Letters Patent are hereby corrected as shown below:

```
Add name of co-inventor
Gregory J. Roszkowski
1301 North Harlem Avenue
Oak Park, Illinois  60302
```

SIGNED AND
SEALED
APR 14 1970

(SEAL)
Attest:

Edward M. Fletcher, Jr.

Attesting Officer

WILLIAM E. SCHUYLER, JR.
Commissioner of Patents